United States Patent
McKenney

(10) Patent No.: US 10,977,042 B2
(45) Date of Patent: Apr. 13, 2021

(54) USING EXPEDITED RCU GRACE PERIODS TO AVOID OUT-OF-MEMORY CONDITIONS FOR OFFLOADED RCU CALLBACKS

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/523,489

(22) Filed: Jul. 26, 2019

(65) Prior Publication Data

US 2021/0026640 A1    Jan. 28, 2021

(51) Int. Cl.
*G06F 9/38* (2018.01)

(52) U.S. Cl.
CPC .................. *G06F 9/3838* (2013.01)

(58) Field of Classification Search
None
See application file for complete search history.

(56) References Cited

U.S. PATENT DOCUMENTS

| | | | |
|---|---|---|---|
| 5,442,758 A | 8/1995 | Slingwine et al. | |
| 5,608,893 A | 4/1997 | Slingwine et al. | |
| 5,727,209 A | 3/1998 | Slingwine et al. | |
| 6,219,690 B1 | 4/2001 | Slingwine et al. | |
| 6,662,184 B1 | 12/2003 | Friedberg | |
| 6,886,162 B1 | 4/2005 | McKenney | |
| 6,996,812 B2 | 2/2006 | McKenney | |
| 7,191,272 B2 | 3/2007 | McKenney | |
| 7,287,135 B2 | 10/2007 | McKenney et al. | |
| 7,353,346 B2 | 4/2008 | McKenney et al. | |
| 7,349,879 B2 | 6/2008 | McKenney et al. | |
| 7,395,263 B2 | 7/2008 | McKenney | |
| 7,395,383 B2 | 7/2008 | McKenney | |
| 7,426,511 B2 | 9/2008 | McKenney | |

(Continued)

OTHER PUBLICATIONS

P. McKenney et al., "Read-Copy Update: Using Execution History to Solve Concurrency Problems," PDCS, Oct. 1998, 11 pages.

(Continued)

*Primary Examiner* — Eric Coleman
(74) *Attorney, Agent, or Firm* — Noah Sharkan, Esq.; Kevin P. Radigan, Esq.; Heslin Rothenberg Farley & Mesiti P.C.

(57) ABSTRACT

A technique for using expedited RCU grace periods to avoid avoiding out-of-memory conditions for offloaded RCU callbacks. In an example embodiment, one or more processors in a computer system may be designated as no-callbacks (No-CBs) processors that do not perform read-copy update (RCU) callback processing. One or more RCU callback offload kernel threads (rcuo kthreads) may be spawned to perform RCU callback management for RCU callbacks generated by workloads running on the No-CBs processors. The rcuo kthreads may run on processors that are not No-CBs processors. The rcuo kthreads may perform RCU grace period waiting as part of their RCU callback management. The RCU grace period waiting may include selectively invoking either an RCU expedited grace period or waiting for a normal RCU grace period to elapse.

20 Claims, 7 Drawing Sheets

(56) References Cited

U.S. PATENT DOCUMENTS

| | | | |
|---|---|---|---|
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 * | 2/2012 | McKenney ........... G06F 16/273 707/610 |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 9,189,413 | B2 | 11/2015 | McKenney |
| 9,250,978 | B2 | 2/2016 | McKenney |
| 9,256,476 | B2 | 2/2016 | McKenney |
| 9,348,765 | B2 * | 5/2016 | McKenney ............. G06F 9/526 |
| 9,396,226 | B2 | 6/2016 | McKenney |
| 9,389,925 | B2 | 7/2016 | McKenney |
| 9,519,307 | B2 | 12/2016 | McKenney |
| 9,552,236 | B2 | 1/2017 | McKenney |
| 9,720,836 | B2 | 8/2017 | McKenney |
| 9,886,329 | B2 * | 2/2018 | McKenney ............. G06F 9/526 |
| 10,146,577 | B2 | 4/2018 | McKenney |
| 9,965,432 | B2 | 5/2018 | McKenney |
| 10,140,131 | B2 | 11/2018 | McKenney |
| 10,268,610 | B1 | 4/2019 | McKenney |
| 10,282,230 | B2 | 5/2019 | McKenney |
| 10,353,748 | B2 | 7/2019 | McKenney |
| 2008/0082532 | A1 | 4/2008 | McKenney |
| 2013/0061071 | A1 | 3/2013 | McKenney |
| 2018/0060086 | A1 | 3/2018 | McKenney |
| 2018/0267840 | A1 | 9/2018 | McKenney |
| 2019/0034231 | A1 | 1/2019 | McKenney |
| 2019/0147077 | A1 | 5/2019 | McKenney |

OTHER PUBLICATIONS

P. McKenney et al., "Read-Copy Update," 2001 Ottawa Linux symposium, Jul. 2001, 22 pages.
H. Lindar et al., "Scalability of the Directory Entry Cache," 2002 Ottawa Linux Symposium, Jun. 26, 2002, pp. 289-300.
P. McKenney et al.,"Read-Copy Update," 2002 Ottawa Linux Symposium, Jul. 8, 2002, 32 pages.
A. Arcangeli et al., "Using Read-Copy-Update Techniques for System V IPC in the Linux 2.5 Kernel," 2003 FREENIX, Jun. 14, 2003, 13 pages.
P. McKenney et al., "Using RCU in the Linux 2.5 Kernel," Linux Journal, Oct. 1, 2003, 11 pages.
P. McKenney et al., "Scaling dcache with RCU," Linux Journal, Jan. 1, 2004, 12 pages.
P. McKenney, "RCU vs. Locking Performance on Different CPUs," 2004 Linux.conf.au, 2004, 18 pages.
P. Zijlstra, "[PATCH] slab: document SLAB_DESTROY_BY_RCU", LKML.org, Nov. 13, 2008, 1 page.
D. Sarma et al., "Making RCU Safe for Deep Sub-Millisecond Response Realtime Applications," 2004 USENIX (UseLinux track) Jun. 2004, 9 pages.
P. McKenney et al., "Extending RCU for Realtime and Embedded Workloads," 2006 Ottawa Linux Symposium, Aug. 11, 2006, 15 pages.
P. McKenney, "Sleepable RCU", LWN.net, Oct. 9, 2006, 10 pages.
T. Gleixner, High Resolution Timers / Dynamic Tics—V2, LWN.net, Oct. 31, 2006, 5 pages.
P. McKenney, "RCU and Unloadable Modules", LWN.net, Jan. 14, 2007, 4 pages.
P. McKenney, "Using Promela and Spin to verify parallel algorithms", LWN.net, Aug. 1, 2007, 11 pages.
P. McKenney, "The design of preemptible read-copy-update," LWN.net, Oct. 8, 2007, 27 pages.
T. Hart et al., "Performance of memory reclamation for lockless synchronization", Journal of Parallel and Distributed Computing, Dec. 2007, pp. 1270-1285.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
P. McKenney, "Integrating and Validating dynticks and Preemptible RCU," LWN.net, Apr. 22, 2008, 19 pages.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Hierarchical RCU," LWN.net, Nov. 4, 2008, 19 pages.
P. McKenney, "Using a Malicious User-Level RCU to Torture RCU-Based Algorithms", linux.conf.au, Jan. 2009, 51 pages.
M. Desnoyers, "Low-Impact Operating System Tracing", University of Montreal, PhD Thesis, Dec. 2009, 233 pages.
P. McKenney, "RCU: The Bloatwatch Edition", LWN.net, Mar. 17, 2009, 9 pages.
P. McKenney, "Expedited "big hammer" RCU grace periods", LKML.org, Jun. 25, 2009, 2 pages.
P. McKenney, "RCU cleanups and simplified preemptable RCU", LKML.org, Jul. 23, 2009, 1 page.
P. McKenney, "Deterministic Synchronization in Multicore Systems: the Role of RCU", Aug. 18, 2009, pp. 1-9.
P. McKenney, "Simplicity Through Optimization", linux.conf.au, Jan. 2010, 109 pages.
P. McKenney, "The RCU API, 2010 Edition", LWN.net, Dec. 8, 2010, 11 pages.
J. Triplett et al., "Resizable, Scalable, Concurrent Hash Tables via Relativistic Programming", ACM-SIGOPS Operating System Review vol. 44, Issue 3, Jul. 2010, 14 pages.
M. Desnoyers et al., "User-Level Implementations of Read-Copy Update", IEEE Transactions on Parallel and Distributed Systems, vol. x, No. y, Jul. 2009, pp. 1-14.
P. McKenney, "Making RCU Safe for Battery-Powered Devices", Embedded Linux Conference, Feb. 15, 2012, pp. 1-66.
P. McKenney, "Real-Time Response on Multicore Systems: It Is Bigger Than You Think", OSPERT '12 Workshop, Jul. 10, 2012, pp. 1-34.
P. McKenney, "Getting RCU Further Out of the Way", 2012 Linux Plumbers Conference, Real Time Microconference, Aug. 31, 2012, 31 pages.
P. McKenney, "The new visibility of RCU processing", LWN.net, Oct. 10, 2012, 4 pages.
P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.

(56) References Cited

OTHER PUBLICATIONS

J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited()?", linux.conf.au, Geelong, Australia, Feb. 3, 2015.
L. Lian et al., "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.

* cited by examiner

USING EXPEDITED RCU GRACE PERIODS TO AVOID OUT-OF-MEMORY CONDITIONS FOR OFFLOADED RCU CALLBACKS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution have been treated as implicit quiescent states. In modern kernel-based RCU implementations, a quiescent state is typically delineated by a kernel code path being outside an RCU read-side critical section. RCU read-side primitives such as rcu_read_lock( ) and rcu_read_unlock( ) are commonly used by the readers to denote the beginning and end of such critical sections.

Grace periods may synchronous or asynchronous. According to the synchronous technique, an updater performs the first phase update operation, invokes a function such as synchronize_rcu( ) to await a grace period, then blocks (waits) until a grace period has completed, and then implements the second phase update operation, such as by removing stale data. According to the asynchronous technique, an updater performs the first phase update operation, specifies the second phase update operation as a callback, invokes a function such as call_rcu( ) to await a grace period and invoke callback processing, then resumes with the knowledge that the callback will eventually be processed at the end of the grace period. Advantageously, callbacks requested by one or more updaters can be batched (e.g., on callback lists) and processed as a group at the end of an asynchronous grace period. This allows asynchronous grace period overhead to be amortized over plural deferred update operations.

In current versions of the mainline Linux® kernel, RCU has been adapted to accommodate Real-time and HPC (High Performance Computing) workloads running in user space. Such RCU implementations support the offloading of RCU callbacks from processors that run such workloads, with the offloaded callbacks being processed by one or more kernel threads (e.g., Linux® kthreads) running on other processors. Currently, the Linux® "CONFIG_RCU_NOCB_CPU=Y" compile parameter activates this functionality. A boot parameter may be used to specify which processors are No-Callbacks (No-CBs) processors. The kthreads that process offloaded RCU callbacks are named "rcuo."

User-mode applications running on the Linux® kernel can initiate a long string of closely spaced calls to call_rcu ( ), such as by entering a tight loop that opens a file and then immediately closes it. This works well for most configurations of RCU, but can result in large numbers of callbacks waiting for an RCU grace period to elapse for kernels built with CONFIG_RCU_NOCB_CPU=y, potentially even resulting in an out-of-memory (OOM) condition. In normal kernels, callback handling and invocation is mediated by a state machine executing in the scheduling-clock interrupt handler, in the RCU_SOFTIRQ handler, and the RCU grace-period kthread. This state machine has numerous components that assist forward progress. In contrast, the forward-progress assistance for CONFIG_RCU_NOCB_CPU=y is much less well-developed, in part because the real-time applications that were anticipated to run on such kernels were expected to impose much lower call_rcu( ) loads.

Computer systems are continuing to provide more processing cores, which increases the motivation for mixed-mode systems that run both real-time and non-real-time applications on the same hardware. In addition, there is motivation to run the same kernel configuration across different workloads. In both of these cases, the non-real-time applications might well impose a maximal call_rcu ( ) load. Applicant submits that there is motivation to support offloading of RCU callbacks while gracefully handling high RCU callback loads.

SUMMARY

A method, system and computer program product are provided for using expedited RCU grace periods to avoid out-of-memory conditions for offloaded RCU callbacks. In an example embodiment, one or more processors in a computer system may be designated as no-callbacks (No-CBs) processors that do not perform read-copy update (RCU) callback processing. One or more RCU callback offload kernel threads (rcuo kthreads) may be spawned to perform RCU callback management for RCU callbacks generated by workloads running on the No-CBs processors. The rcuo kthreads may run on processors that are not No-CBs processors. The rcuo kthreads may perform RCU grace period waiting as part of their RCU callback management. The RCU grace period waiting may include selectively invoking either an RCU expedited grace period or waiting for a normal RCU grace period to elapse.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Figure 1:
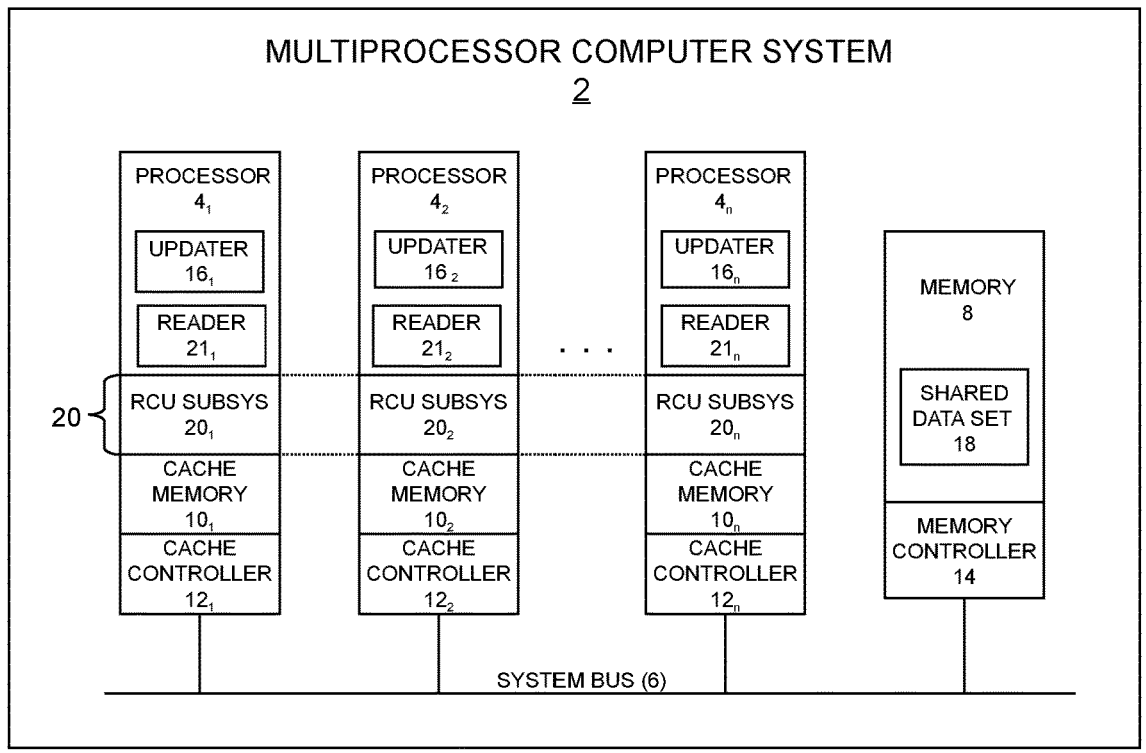
FIG. 1 is a functional block diagram showing a multiprocessor computing system.

Turning now to the figures, wherein like reference numerals represent like elements in all of the several views, FIG. 1 illustrates an example multiprocessor computer system 2 in which OOM avoidance for offloaded RCU callbacks may be implemented. The computer system 2 may include a plurality of processors $4_1, 4_2 \ldots 4_n$, a system bus 6, and a program memory 8. There may also be cache memories $10_1$, $10_2 \ldots 10_n$ and cache controllers $12_1, 12_2 \ldots 12_n$ respectively associated with the processors $4_1, 4_2 \ldots 4_n$. The cache memories 10 may be implemented in several levels (e.g., as level 1, level 2 and level 3 caches) and the cache controllers 12 may collectively represent the cache controller logic that supports each cache level. A memory controller 14 may be associated with the memory 8. The memory controller 14 may be integrated with the processors 4 or could reside separately therefrom, for example, as part of a discrete chipset.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, Internet of Things (IoT) devices, and many other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud).

The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each processor 4 is operable to execute program instruction logic under the control of a software program stored in the memory 8 (or elsewhere). As part of this program execution logic, update operations (updaters) 16 may execute within a process, thread, or other execution context (hereinafter "task") on any of the processors 4. Each updater 16 runs periodically to perform updates on a set of shared data 18 that may be stored in the shared memory 8 (or elsewhere). In FIG. 1, reference numerals $16_1, 16_2 \ldots 16_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 1, reference numbers $20_1$, $20_2 \ldots 20_n$ represent individual RCU instances that may respectively periodically execute on the several processors $4_1, 4_2 \ldots 4_n$.

Figure 5:
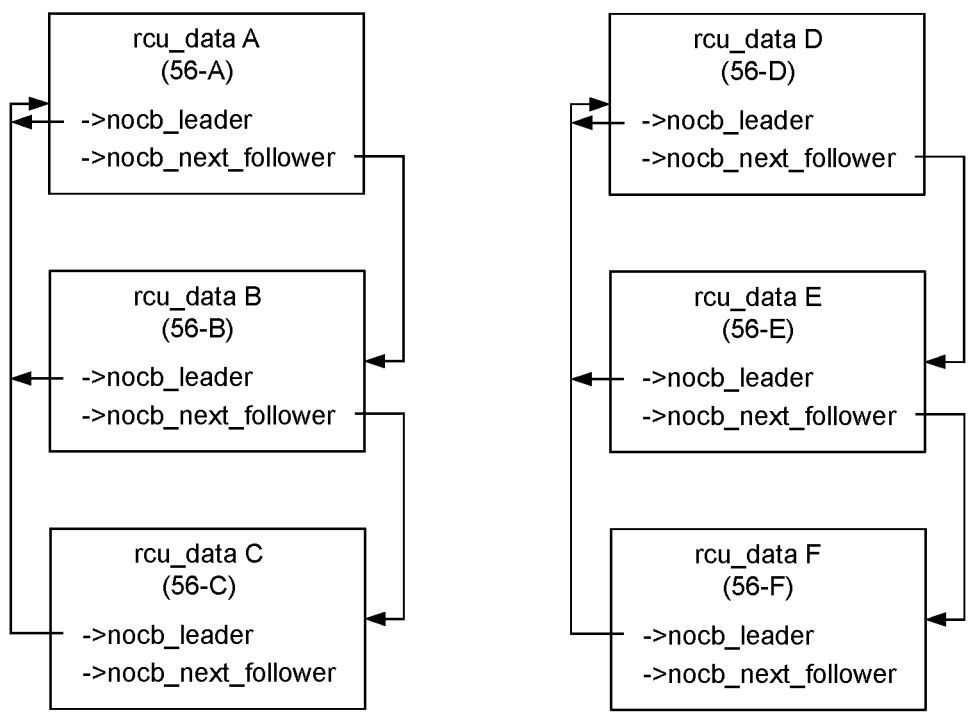
FIG. 5 is a functional block diagram showing an example relationship between rcu_data structures corresponding to leader and follower rcuo kthreads.

Any given processor 4 may also periodically execute a read operation (reader) 21. Each reader 21 runs from program instructions stored in the memory 8 (or elsewhere) in order to periodically perform read operations on the set of shared data 18 stored in the shared memory 8 (or elsewhere). In FIG. 5, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 18 while an updater 16 updates the same data element.

During operation of the computer system 2, an updater 16 will occasionally perform an update to one of the shared data elements 18. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 16 may post a callback to invoke the RCU subsystem 20 that results in the deferred destruction of the pre-update view of the data (second-phase update) following an RCU grace period. The grace period processing performed by the RCU subsystem 20 entails starting new grace periods and detecting the end of old grace periods so that the RCU subsystem 20 knows when it is safe to free stale data (or take other actions).

Figure 2:
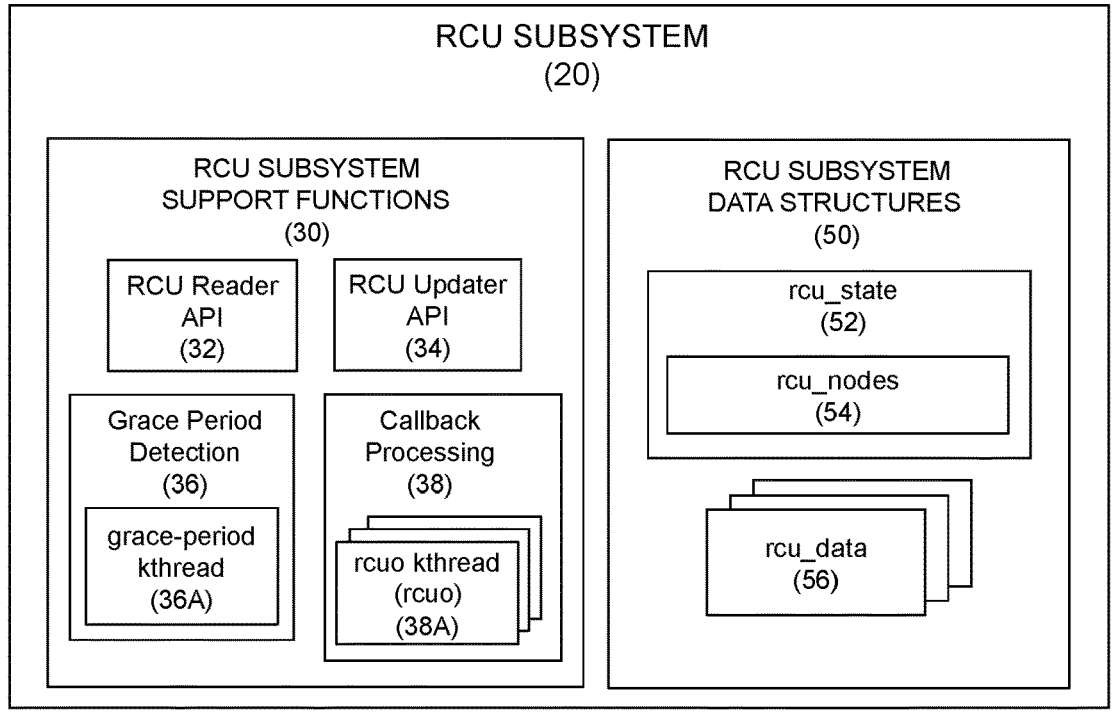
FIG. 2 is a functional block diagram showing an example RCU subsystem that may be provided in the computer system of FIG. 1.

Turning now to FIG. 2, example components of the RCU subsystem 20 are shown. Among these components is a set of RCU subsystem support functions 30, namely, an RCU reader API (Application Programming Interface) 32, an RCU updater API 34, and a set of RCU grace period detection functions 36 and a set of RCU callback processing functions 38.

The RCU reader API 32 may include a reader registration component and a reader unregistration component that are respectively invoked by readers 21 as they enter and leave their RCU read-side critical sections to read shared data 18. In an example embodiment, the reader registration and unregistration components may be respectively implemented using the rcu_read_lock( ) and rcu_read_unlock( ) primitives found in existing read-copy update implementations.

The RCU updater API 34 may include synchronization primitives such as synchronize_rcu ( ) and call_rcu( ) for use by updaters 16 to defer the removal of shared data 18 that may be referenced by the readers 21 until the grace period detection component 36 determines that a grace period has elapsed.

The grace period detection component 36 may include a grace-period kthread 36A that handles various grace period operations, such as grace-period initialization, quiescent-state forcing, and grace-period cleanup. The callback processing component 38 spawns one or more rcuo kthreads 38A that process callbacks at the end of grace periods on behalf of processors 4 in the computer system 2 that have been designated as No-CBs (no callbacks) processors. Each rcuo kthread 38A is assigned to one of the No-CBs processors, but runs on a different processor that is not a No-CBs processor. The rcuo kthreads 38A offload the callback invocation work of the No-CBs processors to the non-No-CBs processors, which improves the performance of HPC and real-time workloads that may run on the No-CBs processors.

With continuing reference now to FIG. 2, the RCU subsystem 20 further includes a set of RCU subsystem data structures 50. These data structures may include an rcu_state structure 52 having embedded therein (e.g., as a linear array) a combining tree of rcu_node structures 54. The RCU subsystem 20 may thus support hierarchical grace period detection. The tree of rcu_node structures may track quiescent states using bitmasks (not shown) that respectively indicate which processor's quiescent states are required in order to end current and future grace periods. Each leaf rcu_node structure 54 may have a set of a per-processor rcu_data structures 56 assigned to it, with each rcu_data structure representing one processor 4 in the computer system 2.

The rcuo kthreads 38A may be periodically awakened by the grace-period kthread 36A at the end of RCU grace periods when an RCU callback needs to be invoked. They may also be awakened when a new RCU callback is registered to them (e.g., via the call_rcu( ) function) and a new grace period is needed. As the number of No-CBs processors rises, the number of rcuo kthreads 38A also rises, which in turn increases the amount of wakeup work that the grace-period kthread 36A must do at the end of each grace period.

Figure 3:
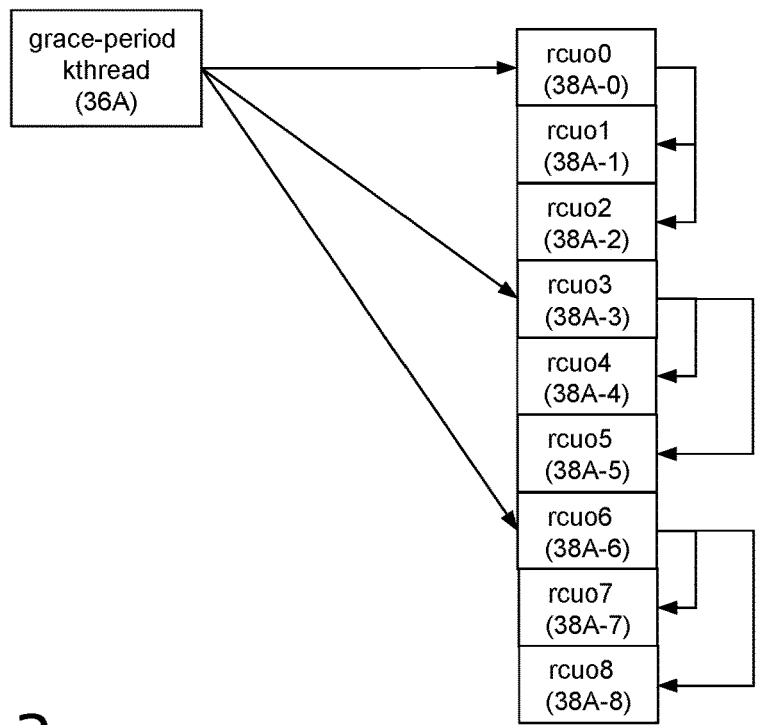
FIG. 3 is a functional block diagram showing an example technique for waking up rcuo kthreads that manage offloaded RCU callbacks.

One way to address the foregoing scalability issue is to create a wakeup hierarchy as exemplified by FIG. 3. Here, the grace-period kthread 36A only needs to awaken a subset of rcuo kthreads, namely, rcuo0, rcuo3, and rcuo6. Each of these "leader" rcuo kthreads may then awaken other "follower" rcuo kthreads in its "group." For example, in the embodiment of FIG. 3, leader kthread rcuo0 awakens follower kthreads rcuo1 and rcuo2, leader kthread rcuo3 awakens follower kthreads rcuo4 and rcuo5, and leader kthread rcuo6 awakens follower kthreads rcuo7 and rcuo7.

Figure 4:
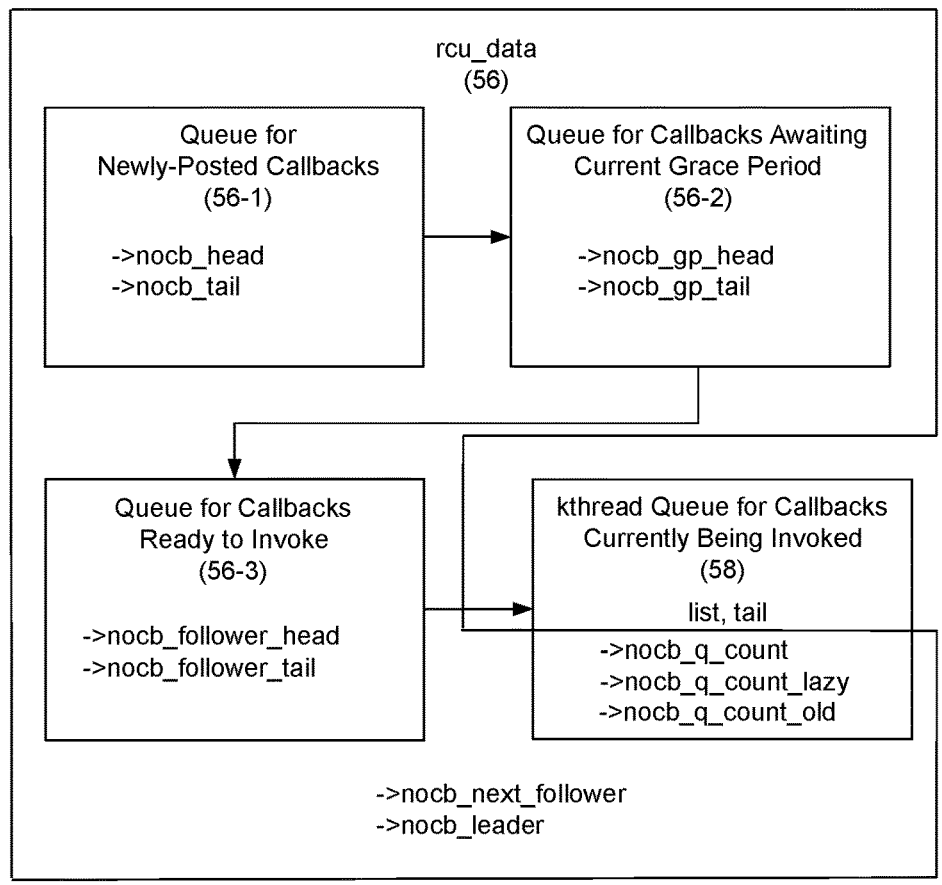
FIG. 4 is a functional block diagram showing fields of an example rcu_data structure that may be implemented by the RCU subsystem of FIG. 2.

Turning now to FIG. 4, several callback queues (56-1, 56-2 and 56-3) may be provided in each rcu_data structure 56. The callback queues 56-1, 56-2 and 563 are used for queuing RCU callbacks to be processed at different times. As described in the next paragraph, each queue 56-1, 56-2 and 56-3 may be defined by a group of two fields. A callback queue 58 may also be provided for each rcuo kthread 38A. As described in the next paragraph, the queue 58 may be defined by three fields of the rcu_data structure 56 and two local variables associated with the top-level function run by the rcu_data structure's associated rcuo kthread 38A. The arrows in FIG. 4 show an example progression of RCU callbacks as they advance through the various queues 56-1, 56-2, 56-3 and 58.

The first callback queue 56-1 of the rcu_data structure 56 may be referred to as a "callbacks-new" queue. This queue is defined by two fields that act together as a single queue containing new RCU callbacks registered by call_rcu( ) (or similar functions), but not yet processed in any way. The first field →nocb_head is a pointer to the head of the queue, and the second field →nocb_tail is a pointer to the tail of the queue.

The second callback queue 56-2 of the rcu_data structures 56 may be referred to as a "callbacks-wait" queue. This queue is defined by two fields that act together as a single queue containing the RCU callbacks that are waiting for the current grace period to end. The first field called →nocb_gp_ head is a pointer to the head of the queue, and the second field →nocb_gp_tail is a pointer to the tail of the queue.

The third callback queue 56-3 of the rcu_data structures 56 may be referred to as a "callbacks-ready" queue. This queue is defined by two fields that act together as a single queue containing the RCU callbacks whose grace period has completed and are ready to be invoked, but whose invocation has not yet been started by associated rcuo kthread. The first field called →nocb_follower_head is a pointer to the head of the queue, and the second field →nocb_follower_tail is a pointer to the tail of the queue.

The fourth callback queue 58 may be referred to as a "callbacks-invoke" queue. This queue is for callbacks that are currently being invoked by the rcu_data structure's associated rcuo kthread 38A. The callback queue 58 may be defined by three fields of the rcu_data structure 56 and two local variables associated with the top-level callback processing function run by the rcuo kthread 38A. The two local variables are a head queue head pointer called "list" and a queue tail pointer called "tail." The three rcu_data structure fields are →nocb_q_count, →nocb_q_count_lazy, and →nocb_q_count_old, which respectively track the count of RCU callbacks on the queues, the count of lazy RCU callbacks on the queues, and the count of RCU callbacks that were queued during the last RCU grace period. As is known, RCU callbacks in the "lazy" category may be delayed for long periods of time, for example in the Linux® kernel, for up to six seconds.

Two additional fields of each rcu_data structure 56 are shown at the bottom of FIG. 4. The first field is a pointer called →nocb_next_follower that references the rcu_data structure 56 associated with the next follower rcuo kthread 38A in the current rcuo kthread group. This is the NULL pointer for the rcu_data structure 56 associated with last follower rcuo kthread 38A in the group. The second field is a pointer called →nocb_leader that references the rcu_data structure 56 associated with the leader rcuo kthread 38A in the current rcuo kthread group. In an embodiment, a leader rcuo kthread 38A may be considered to be a follower of itself. In that case, the →nocb_leader pointer will be self-referential.

FIG. 5 illustrates example sets of rcu_data structures 56 linked into leader-follower groups corresponding to the rcuo kthread groups of their associated rcuo kthreads 38A. In this non-limiting example, rcu_data structure 56-A (rcu_data A) leads a first group consisting of itself and rcu_data structures 56-B (rcu_data B) and 56-C (rcu_data C). Similarly, rcu_data structure 56-D (rcu_data D) leads the second group consisting of itself and rcu_data structures 56E (rcu_data E) and 56-F (rcu_data F).

Figure 6:
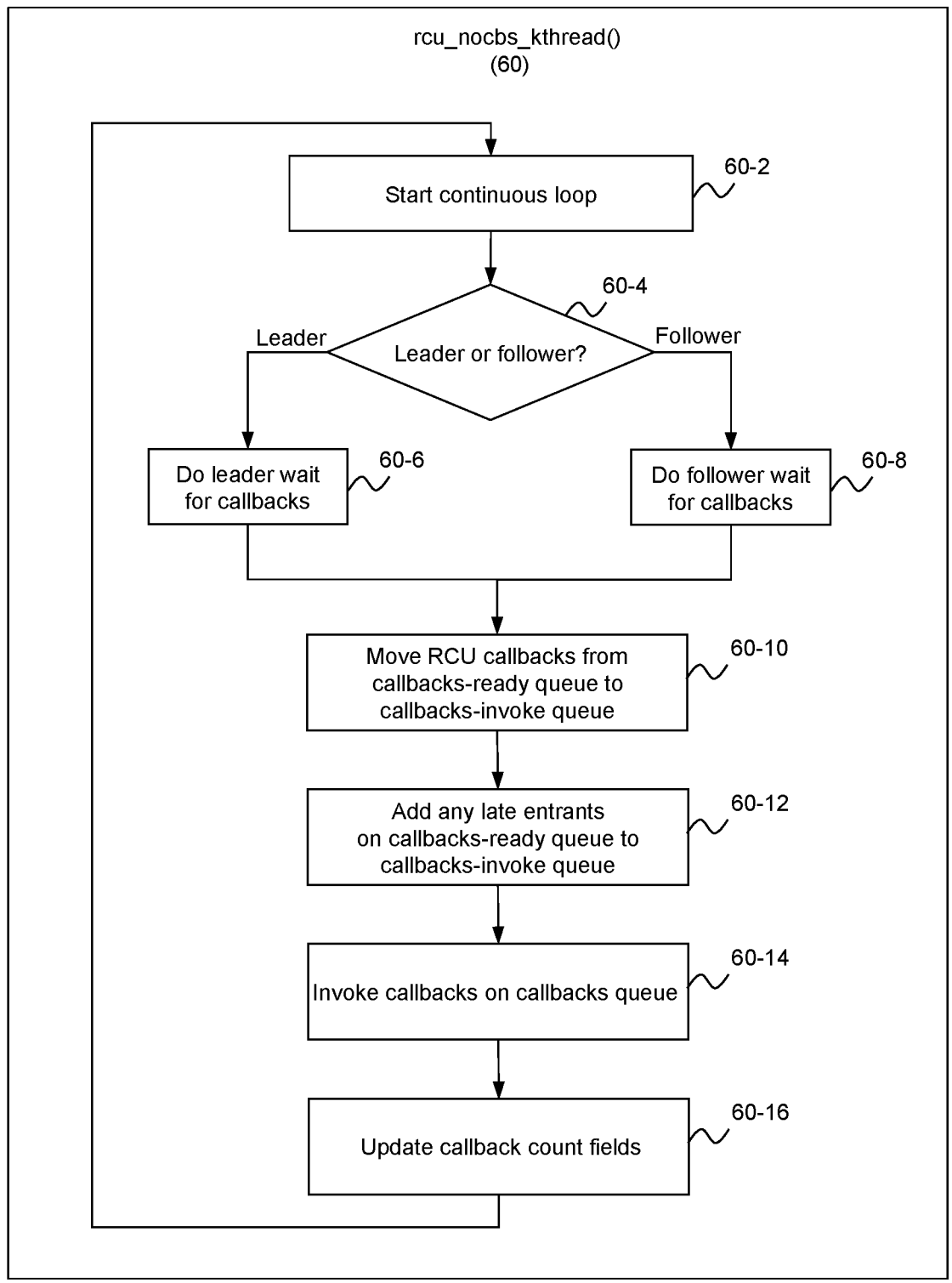
FIG. 6 is a flow diagram showing example operations that may be performed by either leader or follower rcuo kthreads to manage offloaded RCU callbacks.

FIG. 6 illustrates example operations that be used to implement the callback management operations of both leader and follower rcuo kthreads 38A. In an embodiment, these operations may be performed by a function 60 that may be called rcu_nocb_kthread( ). The rcu_nocb_kthread ( ) function 60 is the kthread_run( )-spawned top-level function for the rcuo kthreads 38A. It implements a large for loop that begins in block 60-2. Each pass through the loop invokes a batch of RCU callbacks. As previously noted, each rcuo kthread 38A is associated with a particular rcu_data structure 56. The address of this rcu_data structure 56 may be passed as a parameter of the rcu_nocb_kthread( ) function.

Block 60-4 checks to see if the current rcu_data structure 38A is associated with a leader rcuo kthread 38A, and if so block 60-6 may invoke a function called nocb_leader_wait ( ). Otherwise, if the current rcu_data structure 38A is associated with a follower rcuo kthread 38A, block 60-8 may invoke a function called "nocb_follower_wait( )." Example embodiments of the nocb_leader_wait( ) function and the nocb_follower_wait( ) function are respectively described below in connection with FIGS. 7 and 8. Both functions wait for RCU callbacks that are to be invoked by the rcuo kthread 38A associated with the current rcu_data structure 56. These RCU callbacks will be on the callbacks-ready queue 56-3 of FIG. 4 that consists of the rcu_data structure fields →nocb_follower_head, and →nocb_follower_tail.

Following block 60-6 or 60-8, block 60-10 moves RCU callbacks from the callbacks-ready queue 56-3 of the current rcu_data structure 56 to the callbacks-invoke queue 58 of the rcuo kthread 38A running the rcu_nocbs_kthread( ) function 60. Block 60-10 may use pointer operations to dequeue the callbacks from the former and enqueue them on the latter, then reinitialize the first queue.

Block 60-12 checks for late entrants on the callbacks-ready queue 56-3 and adds them to the callbacks-invoke queue 58. This check handles the possibility that callbacks might have been enqueued on the callbacks-ready queue just as block 60-10 dequeued the full queue. Block 60-14 invokes RCU callbacks on the callbacks-invoke queue 58. Block 60-16 adjusts the →nocb_q_count, →nocb_q_count_lazy and →nocb_q_count_old fields of the kthread callback queue 58 to account for the callbacks just now invoked.

Figure 7:
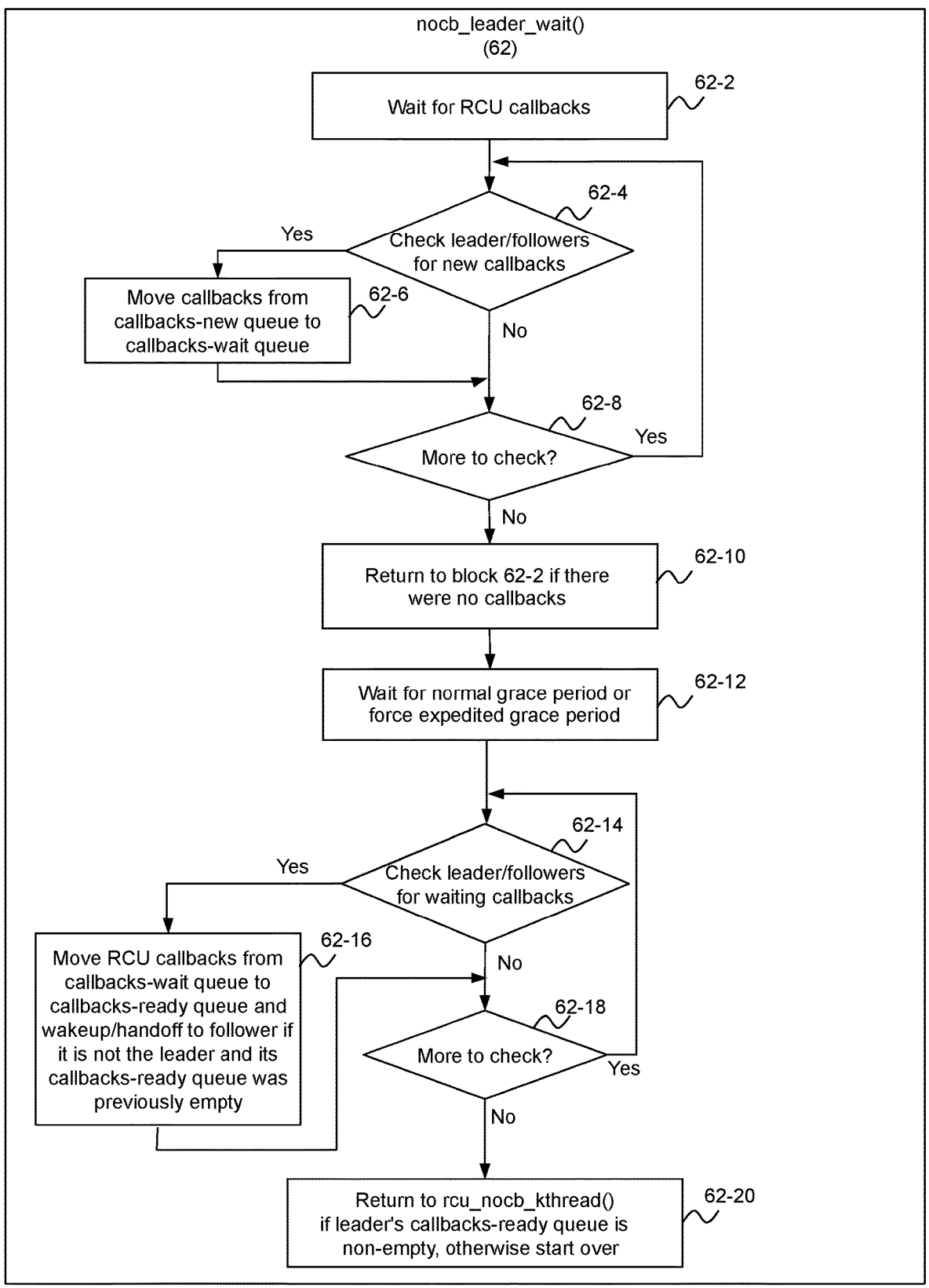
FIG. 7 is a flow diagram showing example operations that may be performed by leader rcuo kthreads to manage off-loaded RCU callbacks.

FIG. 7 illustrates example operations that may be used to implement the nocb_leader_wait( ) function (designated by reference number 62 in FIG. 7), which is the callback waiting function called in block 60-6 of the rcu_nocb_kthread( ) function 60 shown in FIG. 6. The nocb_leader_wait( ) function 62 waits for new RCU callbacks to be posted on the rcu_data structures 56 associated with the leader rcuo kthread 38A and its followers. The function does not return until callbacks appear on the leader rcuo kthread's callbacks-ready queue. Because the leader rcuo kthread 38A handles grace periods for all of its followers, where the leader is considered to be one of its own followers, this function may do work even during times when there are absolutely no callbacks queued for the leader.

Block 62-2 waits for RCU callbacks to appear. The loop spanning blocks 62-4, 62-6 and 62-8 checks the callbacks-new queue 56-1 for the rcu_data structures 56 associated with the leader rcuo kthread 38A and each of its followers, and if so, moves any callbacks thereon (see block 62-6) to the callbacks-wait queue 56-2 of the corresponding rcu_data structures, adjusting the callback and lazy callback counters of each queue.

Block 62-10 returns to block 62-2 if there were no callbacks.

Block 62-12 selectively waits for either a normal grace period to elapse or forces an expedited grace period, after which all of the RCU callbacks in the followers' callbacks-wait queue 56-2 are ready to be advanced to the callbacks-ready queue 56-3. Details of the processing that may be performed by block 62-12 are described in more detail below in connection FIG. 9.

The loop spanning blocks 62-14, 62-16 and 62-18 checks for waiting RCU callbacks on the callbacks-wait queue 56-2 for the rcu_data structures 56 associated with the leader rcuo kthread 38 and each of its followers. If such now-ready callbacks are found, block 62-16 moves them to the callbacks-ready queue 56-3 of the corresponding rcu_data structures. Block 62-10 also wakes up any follower rcuo kthread that is not the leader and whose callbacks-ready queue was previously empty.

Block 62-20 returns to block 62-2 if the leader rcuo kthread's callbacks-ready queue 56-3 is empty. Otherwise, control returns to the rcu_nocb_kthread( ) function 60 of FIG. 6 to allow the RCU callbacks on the callbacks-ready queue 56-3 to be moved to the callbacks-invoke queue 58 and invoked.

Figure 8:
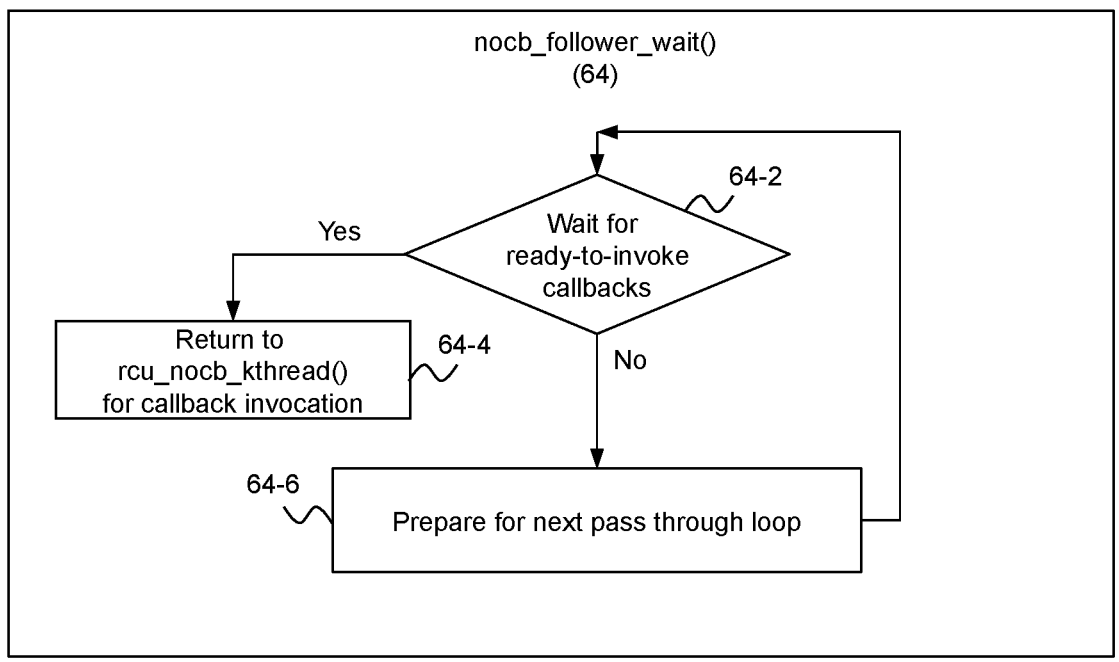
FIG. 8 is a flow diagram showing example operations that may be performed by follower rcuo kthreads to manage off-loaded RCU callbacks.

Turning now to FIG. 8, example operations that may be used to implement a nocb_follower_wait( ) function 64. This function may be used to handle follower callback waiting per block 60-8 of the rcu_nocbs_kthread( ) function of FIG. 6. The nocb_follower_wait( ) function 64 of FIG. 8 is analogous to the nocb_leader_wait( ) function 62 of FIG. 7, but for followers rather than leaders. However, the function 64 is simpler than the function 62 insofar as it need only wait for its own callbacks.

Each pass through the loop spanning blocks 64-2, 64-4 and 64-6 represents one attempt to find new RCU callbacks on the callbacks-ready queue 56-3 of this follower rcuo kthread's rcu_data structure 56 that are now ready to be invoked. Block 64-2 waits for ready-to-invoke callbacks on the callbacks-ready queue 56-3 of the follower rcuo kthread's rcu_data structure 56. When block 64-2 determines there are such ready-to-invoke callbacks, block 64-4 returns to the caller (i.e., the rcu_nocb_kthread( ) function 60 of FIG. 6). The latter function (via block 60-10), will move the callbacks to the callbacks-invoke queue 58 for this follower rcuo kthread 38A and invoke them. If there are no ready-to-invoke callbacks in block 64-2, block 64-6 prepares for the next pass through the loop.

Figure 9:
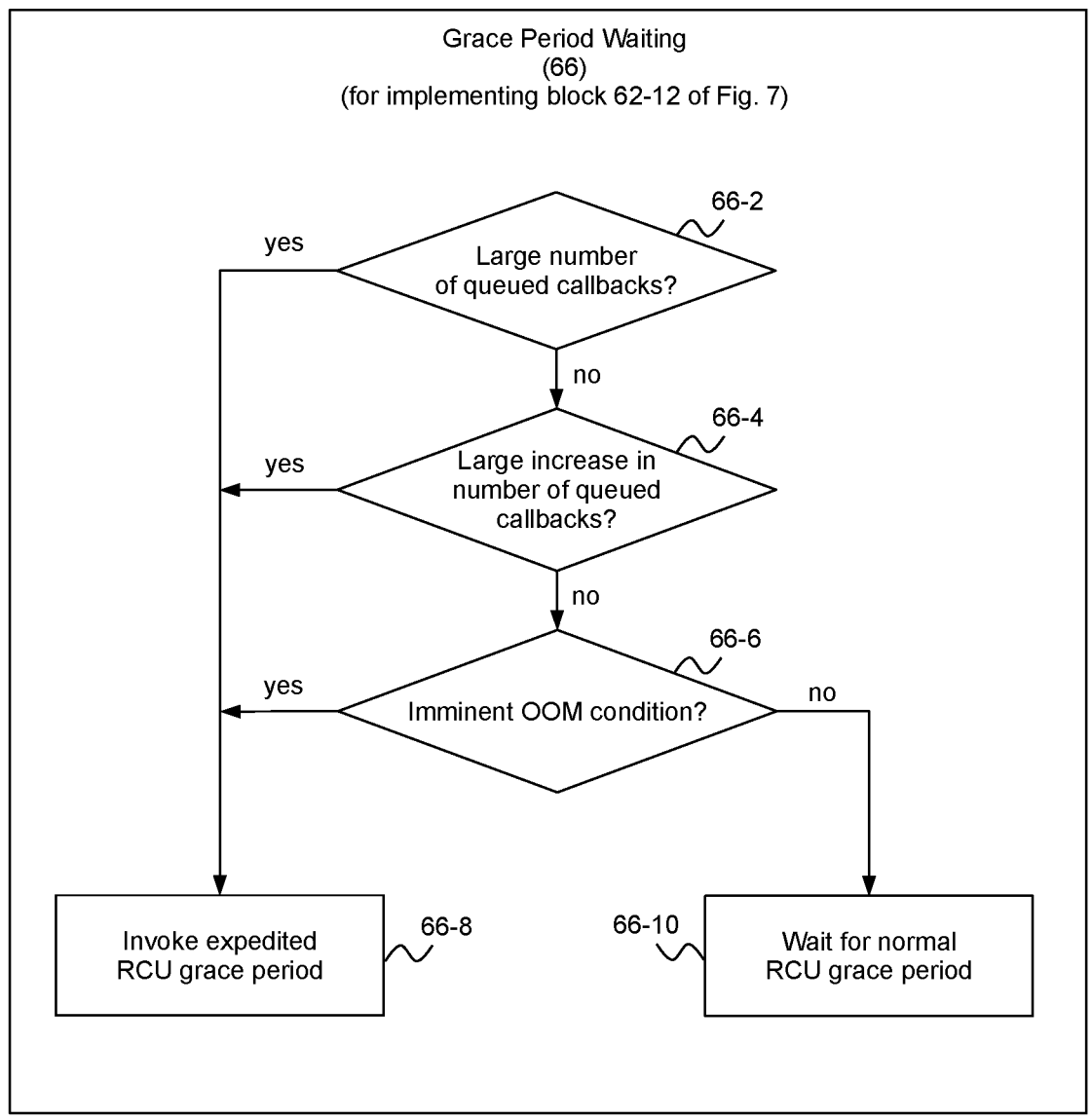
FIG. 9 is a flow diagram shown example operations that may be used when managing off-loaded RCU callbacks to selectively invoke either an expedited RCU grace period or wait for a normal RCU grace period.

Turning now to FIG. 9, example operations that may be performed in block 62-12 of FIG. 7 are shown. These operations are denominated "grace period waiting" and are designated by reference number 66. As noted above, block 62-12 of FIG. 7 selectively waits for either a normal grace period to elapse or forces an expedited grace period. Although it is possible to simply wait for the normal grace period in all cases, this may be problematic for certain workloads. For example, as discussed in the Background section above, user-mode applications running on the Linux® kernel can initiate a long string of closely spaced calls to call_rcu( ), such as by entering a tight loop that opens a file and then immediately closes it. This can result in large numbers of callbacks piling up for kernels built with support for no-callbacks (No-CBs) processors (such as the Linux® kernels built with the CONFIG_RCU_NOCB_CPU=y configuration option), potentially even resulting in an out-of-memory (OOM) condition.

To remedy this situation, block 62-12 may invoke an expedited RCU grace period (e.g., via RCU's synchronize_rcu_expedited( ) function) instead of waiting for a normal RCU grace period (e.g., via RCU's rcu_nocb_wait_gp( ) function). Expedited RCU grace periods send IPI's (interprocessor interrupts) in order to force the interrupted processors through quiescent states. As such, expedited RCU grace periods are generally orders of magnitude faster than normal RCU grace periods. Invoking an expedited RCU grace period instead of waiting for a normal RCU grace period to elapse will result in offloaded callbacks being processed significantly more quickly, thereby reducing callback backlog and possible OOM conditions.

Unfortunately, the IPIs generated by RCU's expedited grace period mechanism are disruptive to workloads running on the CPUs that receive the interrupts. It may therefore be advantageous to avoid excessive use of expedited RCU grace periods unless callback pendency becomes potentially problematic, which does not always happen.

The grace period waiting operation 66 balances the competing concerns of excessive callback pendency versus workload disruption. In an embodiment, this balancing may be handled by selectively invoking either an RCU expedited grace period or waiting for a normal RCU grace period to elapse. More particularly, the use of expedited RCU grace periods may be predicated on the presence of one or more conditions, and normal RCU grace period waiting may be performed when the all of the conditions are absent.

FIG. 9 represents an example embodiment that checks for three alternative conditions warranting the use of an expedited RCU grace period. These conditions are represented by blocks 66-2, 66-4 and 66-6.

Block 66-2 checks whether at least one of the rcu_data structures 56 associated with a group of rcuo kthreads 38A has a specified large number of RCU callbacks queued for processing. This check may be performed using the →nocb_q_count field of the current data structure 56. For example, an expedited RCU grace period may be conditioned on whether the number of RCU callbacks queued for processing during the current RCU grace period (as indicated by →nocb_q_count) is larger than a specified threshold.

Block 66-4 checks whether at least one of the rcu_data structures 56 associated with a group of rcuo kthreads 38A has a specified increased number of RCU callbacks queued for processing since the last RCU grace period. This check may be performed using the →nocb_q_count_old field of the current data structure 56. For example, an expedited RCU grace period may be conditioned on whether the number of RCU callbacks queued for processing during the current RCU grace period is larger by a specified amount than the →nocb_q_count_old number of RCU callbacks queued for processing during the last RCU grace period.

Block 66-6 checks whether the computer system 2 is currently low on memory, such that a possible OOM condition is imminent. In an embodiment based on a Linux® RCU implementation, this check may be assisted by the Linux® kernel's existing facilities for determining how much memory it is using. Two variables may be defined, one being a global Boolean variable (which may be called "rcu_oom") that is initially false, and another unsigned long global variable (which may be called "rcu_oom_jiffies") that is initially zero. An OOM notifier may be provided that sets rcu_oom to true and rcu_oom_jiffies to the Linux® jiffies free-running ticks-since-boot counter. The OOM notifier may be invoked by the Linux® kernel's OOM subsystem when foraging for memory to be freed. In Block 66-6, an expedited RCU grace period may be conditioned on whether rcu_oom is true and rcu_oom_jiffies is not too old (for example, if it is equal to the current value of the jiffies counter).

If any of the conditions of blocks 66-2, 66-4 and 66-6 are satisfied, processing may proceed to block 66-8, which invokes an expedited RCU grace period. Otherwise, processing may proceed to block 66-10, which waits for a normal RCU grace period.

Accordingly, a technique has been disclosed for using expedited RCU grace periods to avoid out-of-memory conditions for offloaded RCU callbacks.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method, comprising:
designating one or more processors in a computer system as no-callbacks (No-CBs) processors that do not perform read-copy update (RCU) callback processing;
spawning one or more RCU callback offload kernel threads (rcuo kthreads) to perform RCU callback management for RCU callbacks generated by workloads running on the No-CBs processors, the rcuo kthreads running on processors that are not No-CBs processors:
the rcuo kthreads performing RCU grace period waiting as part of their RCU callback management;
the RCU grace period waiting comprising selectively invoking either an RCU expedited grace period or waiting for a normal RCU grace period to elapse; and
wherein the RCU expedited grace period is invoked in response to a memory-related condition relating to or effecting RCE callback processing.

2. The method of claim 1, wherein the RCU expedited grace period is invoked in response to a condition.

3. The method of claim 1, wherein the RCU expedited grace period is invoked in response to any of several conditions.

4. The method of claim 1, wherein the RCU expedited grace period is invoked in response to a selected large number of RCU callbacks being queued for processing.

5. The method of claim 1, wherein the RCU expedited grace period is invoked in response to a number of RCU callbacks being queued that is larger by a specified amount than a number of RCU callbacks queued for processing during a previous RCU grace period.

6. The method of claim 1, wherein the RCU expedited grace period is invoked in response to an imminent out-of-memory condition.

7. The method of claim 5, wherein the imminent out-of-memory condition is detected using a kernel subsystem that frees memory in response to an imminent out-of-memory condition.

8. A system, comprising:
a plurality of processors;
a memory coupled to said processors, said memory including a computer readable storage medium tangibly embodying at least one program of instructions executable by said processors to perform operations comprising:
designating one or more processors in a computer system as no-callbacks (No-CBs) processors that do not perform read-copy update (RCU) callback processing;
spawning one or more RCU callback offload kernel threads (rcuo kthreads) to perform RCU callback management for RCU callbacks generated by workloads running on the No-CBs processors, the rcuo kthreads running on processors that are not No-CBs processors:
the rcuo kthreads performing RCU grace period waiting as part of their RCU callback management;
the RCU grace period waiting comprising selectively invoking either an RCU expedited grace period or waiting for a normal RCU grace period to elapse; and
wherein the RCU expedited grace period is invoked in response to a memory-related condition relating to or effecting RCE callback processing.

9. The system of claim 8, wherein the RCU expedited grace period is invoked in response to a condition.

10. The system of claim 8, wherein the RCU expedited grace period is invoked in response to any of several conditions.

11. The system of claim 8, wherein the RCU expedited grace period is invoked in response to a selected large number of RCU callbacks being queued for processing.

12. The system of claim 8, wherein the RCU expedited grace period is invoked in response to a number of RCU callbacks being queued that is larger by a specified amount than a number of RCU callbacks queued for processing during a previous RCU grace period.

13. The system of claim 8, wherein the RCU expedited grace period is invoked in response to an imminent out-of-memory condition.

14. The system of claim 13, wherein the imminent out-of-memory condition is detected using a kernel subsystem that frees memory in response to an imminent out-of-memory condition.

15. A computer program product, comprising:
one or more computer readable data storage media;
program instructions stored on said one or more computer readable data storage media for programming a data processing platform having a plurality of processors to perform operations comprising:
designating one or more processors in a computer system as no-callbacks (No-CBs) processors that do not perform read-copy update (RCU) callback processing;
spawning one or more RCU callback offload kernel threads (rcuo kthreads) to perform RCU callback management for RCU callbacks generated by workloads running on the No-CBs processors, the rcuo kthreads running on processors that are not No-CBs processors:
the rcuo kthreads performing RCU grace period waiting as part of their RCU callback management;
the RCU grace period waiting comprising selectively invoking either an RCU expedited grace period or waiting for a normal RCU grace period to elapse; and
wherein the RCU expedited grace period is invoked in response to a memory-related condition relating to or effecting RCE callback processing.

16. The computer program product of claim 15, wherein the RCU expedited grace period is invoked in response to a condition.

17. The computer program product of claim 15, wherein the RCU expedited grace period is invoked in response to any of several conditions.

18. The computer program product of claim 15, wherein the RCU expedited grace period is invoked in response to a selected large number of RCU callbacks being queued for processing.

19. The computer program product of claim 15, wherein the RCU expedited grace period is invoked in response to a number of RCU callbacks being queued that is larger by a specified amount than a number of RCU callbacks queued for processing during a previous RCU grace period.

20. The computer program product of claim 15, wherein the RCU expedited grace period is invoked in response to an imminent out-of-memory condition.

* * * * *